April 18, 1933.  E. L. FICKETT  1,903,988
CUTTER FOR CUTTING SPIRAL BEVEL GEARS
Filed Nov. 29, 1929
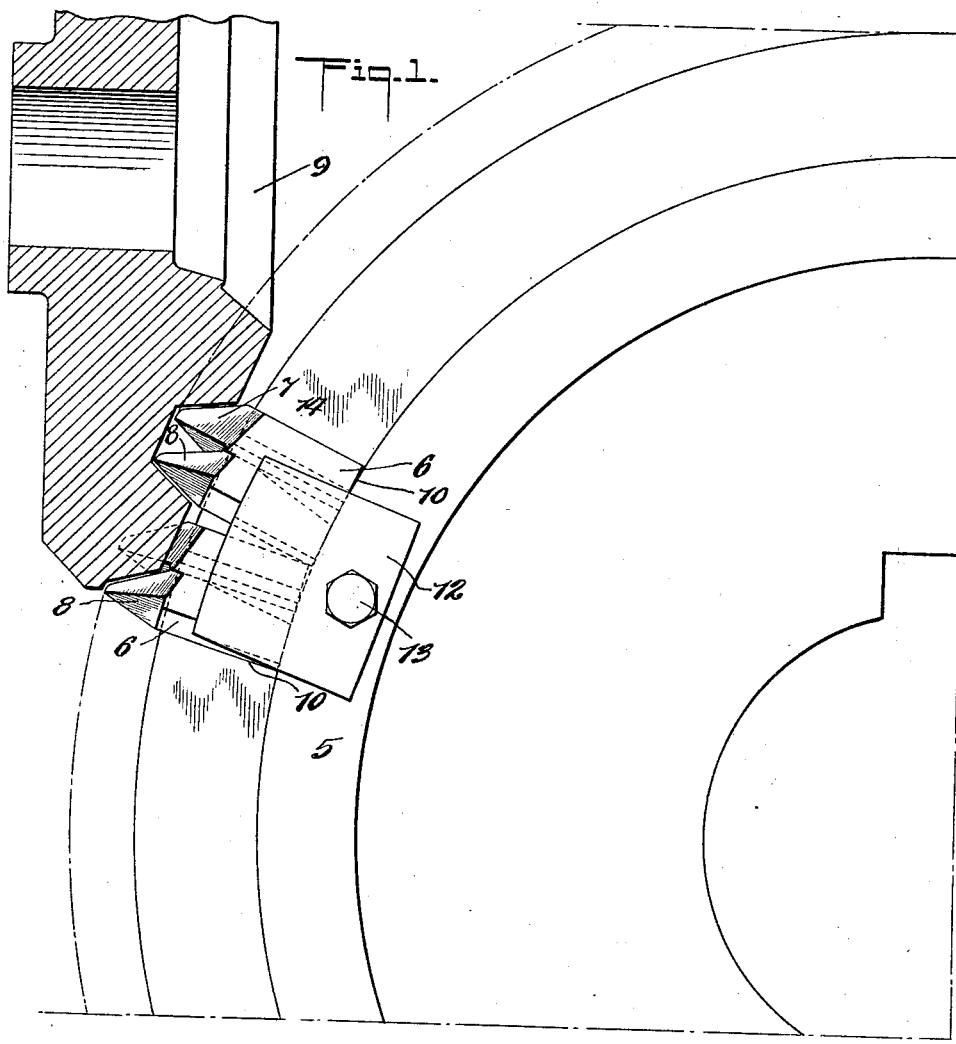
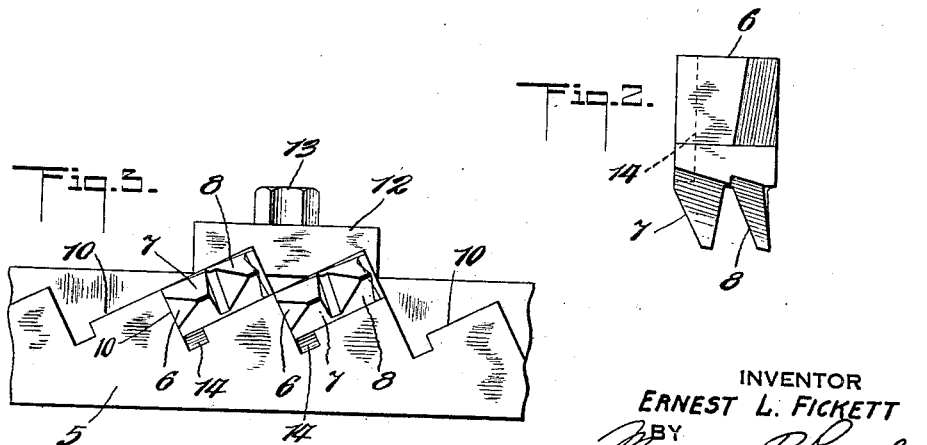
INVENTOR
ERNEST L. FICKETT
BY
ATTORNEY Patented Apr. 18, 1933

1,903,988

UNITED STATES PATENT OFFICE

ERNEST L. FICKETT, OF FITCHBURG, MASSACHUSETTS, ASSIGNOR TO MANNING, MAXWELL & MOORE, INC., OF NEW YORK, N. Y., A CORPORATION OF NEW JERSEY

CUTTER FOR CUTTING SPIRAL BEVEL GEARS

Application filed November 29, 1929. Serial No. 410,359.

The present invention has for an object to provide an improved apparatus for cutting spiral bevel gears.

Spiral bevel gears may be so cut that the teeth are of uniform cross-section from end to end with tapering spaces therebetween, they may be so cut that the spaces are of uniform cross-section from end to end with the teeth tapering or they may be so cut that the teeth and spaces taper to the same extent. The present invention provides an apparatus whereby the gears may be cut with the teeth and spaces both tapering, the apparatus being of such a character that the gears may be cut expeditiously and economically.

The nature and objects of the invention will be better understood from a consideration of a particular illustrative embodiment thereof for the purpose of which description reference should be had to the accompanying drawing forming a part hereof and in which—

Figure 1 is a side view of a rotatable cutter embodying the invention shown in operative relation to a spiral bevel gear being cut thereby, Fig. 2 is a detail view of a bit having a pair of cutting teeth, and Fig. 3 is a detail view indicating the manner in which the teeth are secured in the rotatable holder.

The cutter shown for the purposes of illustrating the principles of the invention comprises a rotatable holder 5 in which are secured a number of bits 6 having pairs of cutting teeth 7, 8. The cutter is shown in operative relation to a spiral bevel gear 9, the gear and cutter being shown in an intermediate operative position with the gear partially cut for the purposes of illustration.

In the operation of cutting the spiral bevel gear the gear cutter is fed along the face of the blank in a direction substantially parallel to an element of the pitch cone of the blank, the cutter and blank being simultaneously rotated at a speed determined by the relative numbers of teeth and the rate of feed.

In the arrangement illustrated, the two lateral cutting edges of each pair of teeth which cut, respectively, opposite tooth faces are arranged to cut substantially in the same axial plane of the blank to generate Archimedean spiral curves, but if an involute curve or some other curve is desired suitable changes can be made. These cutting edges therefore because they move along the same plane will cut both tooth faces on the same spiral curves. The teeth and spaces of the gear cut therefore will taper to the same extent. In the particular structure shown the cutting edges of the bits lie substantially in a transaxial plane, that is to say in a plane at right angles to the axis of the rotatable cutter, but it will be understood that these cutting edges might operate effectively in a surface of revolution not a plane, it being sufficient if both cutting edges of each tooth operate substantially in the same surface of revolution so that both cutting edges will be suitably related to the blank during the cutting operation to generate the same spiral curve along the pitch cone of the blank.

It will be noted that in the particular apparatus shown the cutting edges of the bits do not lie absolutely in the transaxial plane but at a slight angle. This compromise is made to obtain the desired tooth angles and is found not to introduce an objectionable error. Satisfactory results are obtained when the points of the teeth lie in the same transaxial plane.

The bits are secured in sockets 10 by means of suitable clamps 12, and clamp bolts 13, each clamp holding two bits. The bits and sockets are formed with a more or less substantial interlock comprising a projection 14 formed on one side of each bit and entering a corresponding slot in each seal of the cutter member, as shown in the drawing to prevent slipping under the stresses of the cutting operation.

The foregoing particular description is illustrative merely and is not intended as defining the limits of the invention.

I claim:

1. A rotatable toothed cutter for cutting spiral bevel gears having cutting teeth both lateral cutting edges of each of which lie in substantially the same plane at an angle to the axis of the cutter and so arranged that the teeth and spaces of a spiral bevel gear cut thereby will be of uniform cross-section throughout their length and will taper substantially equally, substantially as described.

2. A rotatable toothed cutter for cutting spiral bevel gears having cutting teeth the lateral cutting edges of which are arranged in pairs, the edges of each pair lying substantially in a plane at right angles to the axis of the cutter, substantially as described.

3. A rotatable toothed cutter for cutting spiral bevel gears comprising a flat disc having cutting teeth each provided with a pair of lateral cutting edges both of which lie in substantially the same surface of revolution, substantially as described.

4. A rotatable toothed cutter comprising a rotatable holder and pairs of bits removably secured therein, the bits of each pair constituting one cutting tooth, the lateral cutting edges of which lie in substantially the same plane at right angles to the axis of the cutter, substantially as described.

In testimony whereof, I have signed my name to this specification this 15th day of October, 1929.

ERNEST L. FICKETT.